(12) United States Patent
Nadathur et al.

(10) Patent No.: US 8,037,524 B1
(45) Date of Patent: Oct. 11, 2011

(54) SYSTEM AND METHOD FOR DIFFERENTIATED CROSS-LICENSING FOR SERVICES ACROSS HETEROGENEOUS SYSTEMS USING TRANSIENT KEYS

(75) Inventors: Gokul Nadathur, Freemont, CA (US); Samiullah Mohammed, Sunnyvale, CA (US); Aseem Vaid, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 1148 days.

(21) Appl. No.: 11/765,190

(22) Filed: Jun. 19, 2007

(51) Int. Cl.
*H04L 29/00* (2006.01)

(52) U.S. Cl. ............... 726/21; 713/161; 713/169

(58) Field of Classification Search ......... 726/3, 4; 713/161, 169; 1/1
See application file for complete search history.

(56) References Cited

U.S. PATENT DOCUMENTS

| | | |
|---|---|---|
| 1,310,719 A | 7/1919 | Vernam |
| 4,262,329 A | 4/1981 | Bright et al. |
| 4,558,176 A | 12/1985 | Arnold et al. |
| 4,757,533 A | 7/1988 | Allen et al. |
| 5,185,717 A | 2/1993 | Mori |
| 5,235,641 A | 8/1993 | Nozawa |
| 5,265,159 A | 11/1993 | Kung |
| 5,677,952 A | 10/1997 | Blakley, III et al. |
| 5,687,237 A | 11/1997 | Naclerio |
| 5,870,468 A | 2/1999 | Harrison |
| 5,931,947 A | 8/1999 | Burns |
| 5,933,498 A | 8/1999 | Schneck et al. |
| 5,940,507 A | 8/1999 | Cane |
| 6,073,237 A | 6/2000 | Ellison |
| 6,134,660 A | 10/2000 | Boneh et al. |
| 6,212,600 B1 | 4/2001 | Friedman et al. |
| 6,249,866 B1 | 6/2001 | Brundrett |
| 6,345,101 B1 | 2/2002 | Shukla |
| 6,356,941 B1 | 3/2002 | Cohen |
| 6,405,315 B1 | 6/2002 | Burns et al. |
| 6,414,884 B1 | 7/2002 | DeFelice et al. |
| 6,507,911 B1 | 1/2003 | Langford |
| 6,550,011 B1 | 4/2003 | Sims, III |
| 6,625,734 B1 | 9/2003 | Marvit et al. |
| 6,671,705 B1 * | 12/2003 | Duprey et al. .................. 1/1 |
| 6,735,693 B1 | 5/2004 | Hamlin |
| 6,754,827 B1 | 6/2004 | Cane et al. |
| 6,839,437 B1 | 1/2005 | Crane et al. |

(Continued)

OTHER PUBLICATIONS

Anderson et al., "The Steganographic File System," Information Hiding, Second International Workshop, IH '98 Portland, Oregon, USA, Apr. 14-17, 1998, Proceedings, pp. 73-82, 1998.

(Continued)

*Primary Examiner* — Vivek Srivastava
*Assistant Examiner* — Thong Truong
(74) *Attorney, Agent, or Firm* — Cesari and McKenna, LLP (57) ABSTRACT

A system and method for guard point licensing is provided. Licensed software executing on a storage system is modified to include one or more guard points to ensure that appropriate licenses have been obtained by a customer. During initialization of a guard point, a management system obtains a first random number (R1) from the first system and passes R1 and an application specific context command to the second system. The second system returns to the management system a pass phrase and a second random number (R2), which are then forwarded to the first system. The pass phrase is a data structure identifying the system that generated the pass phrase as well as containing the application specific context command. The above steps are then repeated with the first and second systems inverted.

22 Claims, 4 Drawing Sheets

U.S. PATENT DOCUMENTS

| | | | |
|---|---|---|---|
| 6,857,076 | B1 | 2/2005 | Klein |
| 6,915,435 | B1 | 7/2005 | Merriam |
| 6,993,661 | B1 | 1/2006 | Garfinkel |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,215,771 | B1 | 5/2007 | Hamlin |
| 7,240,197 | B1 | 7/2007 | Yamagami et al. |
| 7,260,724 | B1 | 8/2007 | Dickinson et al. |
| 2003/0028765 | A1 | 2/2003 | Cromer et al. |
| 2004/0030668 | A1 | 2/2004 | Pawlowski et al. |
| 2004/0172532 | A1* | 9/2004 | Silverbrook ............... 713/161 |
| 2005/0105731 | A1* | 5/2005 | Basquin .................... 713/169 |

OTHER PUBLICATIONS

Antonelli, et al., "The Packet Vault: Secure Storage of Network Data," CITI Technical Report 98-5, pp. 1-15, Jun. 25. 1998.

Blaze, "Oblivious Key Escrow," Information Hiding, First International Workshop, Cambridge, UK, May 3-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email—Company Business and Marketing," Edge: Work-Group Computing Report, http://findarticles.com/p/articJes/mLmOWUB/is_1999_0cU 1/aL56260487/print (Oct. 11, 1999).

Double, "Encryption Key Security by Electric Field Destruction of Memory Cells," IBM Technical Disclosure Bulletin, pp. 8-11, Jan. 1989.

FIPS Pub 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS Pub 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81,1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes et al., "Handbook of Applied Cryptography," CRC Press, Section 13.7.1, 4 pages, 1997.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AIEE. pp. 109-115, Feb. 1926.

Weingart, "Physical Security for the μABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

* cited by examiner

SYSTEM AND METHOD FOR DIFFERENTIATED CROSS-LICENSING FOR SERVICES ACROSS HETEROGENEOUS SYSTEMS USING TRANSIENT KEYS

FIELD OF THE INVENTION

This invention relates to licensing of software and more particularly to guard point licensing of software.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual user data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object or any other storage entity that does not correspond directly to a set of fixed data storage devices. A file system is, generally, a computer system for managing such files, including the allocation of fixed storage space to store files on a temporary basis.

The file server, or storage system, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Certain storage systems may support multi-protocol access and, to that end, enable clients to access data via both block and file-level requests. One example of such a storage system is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al.

Certain storage systems may also include functionality to mirror data from a source storage system to a destination storage system. Furthermore, many storage system implementations include other capabilities that are utilized amongst a plurality of storage systems including, e.g., load balancing, mirroring, backup and/or restore operations, etc. Storage system vendors may utilize a multi-tiered licensing model for these functionalities, i.e., the same functionality may be licensed at different price points for different types of storage systems. For example, higher-end enterprise class storage systems may be licensed at a higher price point than lower-end storage systems intended for use by small/medium businesses. The difference in price points may reflect improved functionality available on enterprise class systems and/or the ability to cross subsidize costs, i.e., to lower prices for licensed functionality available on lower-end storage system functionalities by charging more for the same functionality available on higher-end systems. Storage system vendors may utilize tiered licensing schemes for various other functions, e.g., licensing of certain data access protocols, etc.

A noted disadvantage of such multi-tiered licensing arises when, e.g., a customer purchases both an enterprise class storage system and one or more lower-end storage systems. The user may utilize the licensed functionality of the lower-end storage system to interoperate with the enterprise class storage system, thereby recognizing a substantial cost savings to the customer and lost revenue to the vendor. For example, a customer may purchase an enterprise class storage system for use as its primary storage system. The customer may also purchase a lower-end storage system for use as a mirroring destination, which typically costs substantially less than a license for such functionality on the enterprise class storage system. Similar disparities in licensing may occur in other non-storage system environments including, e.g., in application service provider environments, etc.

SUMMARY OF THE INVENTION

The present invention overcomes the disadvantages of the prior art by providing for guard point licensing of software functionality. Licensed software executing on a storage system is modified to include one or more guard points to ensure that appropriate licenses have been obtained by a customer. Generally, a guard point is invoked at any point during execution of an operation associated with a multi-tiered licensed process. To initialize a guard point, a management system obtains a first random number (R1) from the first system and passes R1 along with an application specific context command to the second system. The application specific context command is illustratively a text string utilized to initiate the operation in which the guard point was reached. The second system returns to the management system a pass phrase and a second random number (R2), which are then forwarded to the first system. The pass phrase is illustratively a data structure identifying the system that generated the phrase as well as containing the application specific context command. The above steps are then repeated with the first and second systems inverted, i.e., the management system obtains a first random number from the second system and passes the first random number and an application specific context command to the first system, etc.

Once the first and second systems have both received the pass phrase from each other, they verify the received pass phrases. Verification may be performed at each system by comparing each received pass phrase, including the received application specific context command with the application specific context command sent by the other system. Furthermore, each system may verify that system identification information, e.g., a serial number and/or model number, matches that of the other system involved in the operation. If the pass phrases do not match, the guard point remains "closed" and the operation is not permitted to be executed. However, if the pass phrases match, then the management system opens the guard point and operation execution is permitted to continue. Once verification is completed, the guard point is closed to thereby require additional verification for any subsequent operations invoking the guard point. Furthermore, each guard point includes an illustrative timeout period between the initialization and execution of the guard point. Should the timeout period be exceeded, the guard point closes itself and new pass phrases must be regenerated.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides for guard point licensing of software functionality. Licensed software executing on a storage system is modified to include one or more guard points to ensure that appropriate licenses have been obtained by a customer. Generally, a guard point is invoked at any point during execution of an operation associated with a multi-tiered licensed process. To initialize a guard point, a management system obtains a first random number (R1) from the first system and passes R1 along with an application specific context command to the second system. The second system returns to the management system a pass phrase and a second random number (R2), which are then forwarded to the first system. The above steps are then repeated with the first and second systems inverted, i.e., the management system obtains a first random number from the second system and passes the first random number and an application specific context command to the first system, etc.

Once the first and second systems have both received the pass phrase from each other, they verify the received pass phrases. If the pass phrases do not match, the guard point remains "closed" and the operation is not permitted to be executed. However, if the pass phrases match, then the management system opens the guard point and operation execution is permitted to continue. Once verification is completed, the guard point is closed to thereby require additional verification for any subsequent operations invoking the guard point. Furthermore, each guard point includes an illustrative timeout period between the initialization and execution of the guard point. Should the timeout period be exceeded, the guard point closes itself and new pass phrases must be regenerated.

A. Network and File Server Environment

Figure 1:
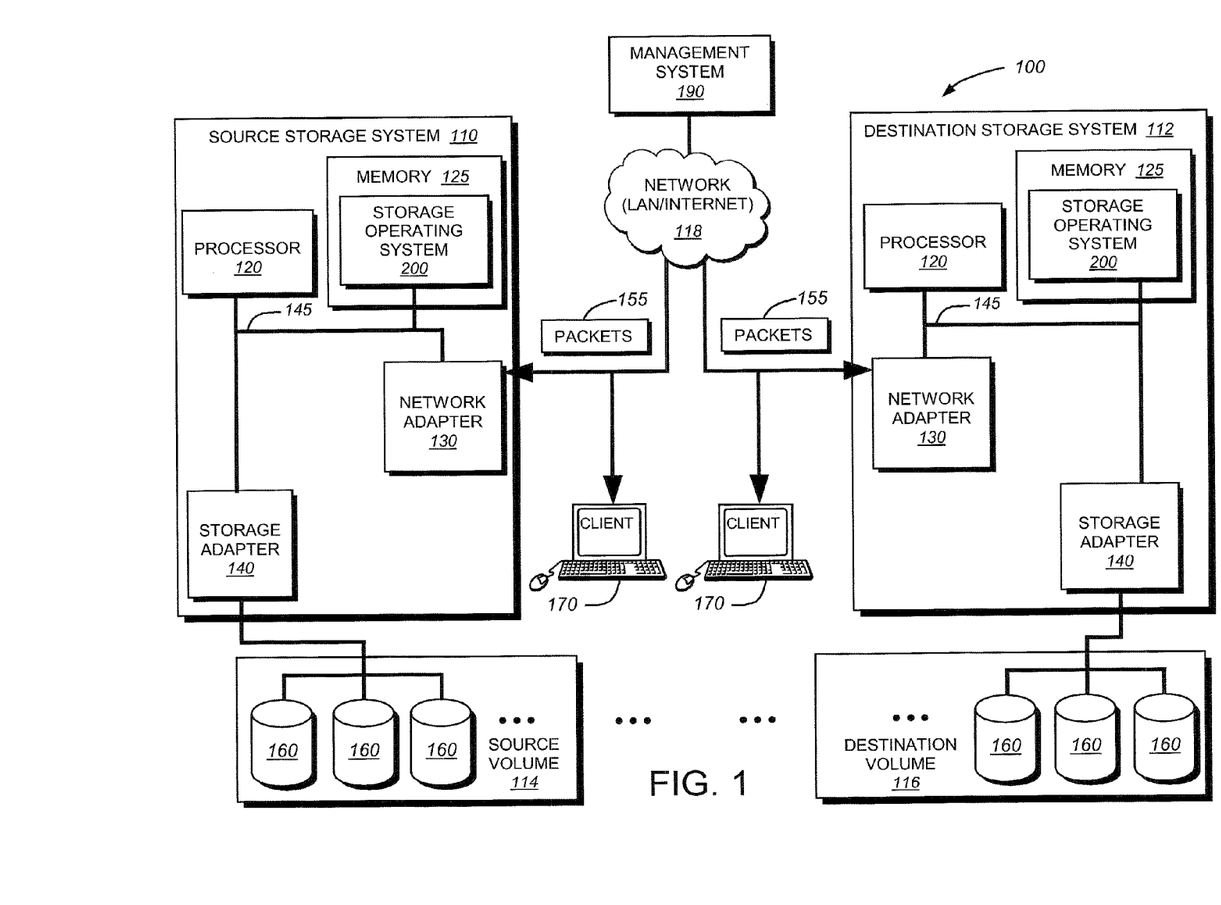
FIG. 1 is a schematic block diagram of an exemplary storage system environment in accordance with an illustrative embodiment of the present invention.

FIG. 1 is a schematic block diagram of a storage system environment 100 that includes a plurality of interconnected storage systems including a source storage system 110 and a destination storage system 112 that may each be advantageously used in accordance with an illustrative embodiment of the present invention. For the purposes of this description, the source storage system is a networked computer that manages storage on one or more source volumes 114, each having an array of storage disks 160 (described further below). Likewise, the destination storage system 112 manages storage on one or more destination volumes 116, also comprising an array of disks 160. The source and destination storage systems are linked via a network 118 that may comprise a local or wide area network, such as the well-known Internet. A network adapter 130 residing in each storage system 110, 112 facilitates communication over the network 118. For the purposes of this description, like components in each of the source and destination storage system 110, and 112 respectively, are described with like reference numerals.

As used herein, the term "source" can be broadly defined as a location from which data travels and the term "destination" can be defined as the location to which the data travels. While a source storage system and a destination storage system, connected by a network, is a particular example of a source and destination used herein, a source and destination could be computers/storage systems linked via a direct link, or via loopback (a "networking" arrangement internal to a single computer for transmitting a data stream between local source and local destination), in which case the source and the destination are the same storage system.

In the example of a pair of networked source and destination storage systems, each storage system 110 and 112 can be any type of special-purpose computer (e.g., server) or general-purpose computer, including a standalone computer. The source and destination storage systems 110, 112 each comprise a processor 120, a memory 125, a network adapter 130 and a storage adapter 140 interconnected by a system bus 145. Each storage system 110, 112 also includes a storage operating system 200 (FIG. 2) that implements a file system to logically organize the information as a hierarchical structure of directories and files on the disks.

A management system 190 is also operatively interconnected with the network 118. The management system 190 illustratively includes software (not shown) adapted for managing guard point licensed operations in accordance with an illustrative embodiment of the present invention, as described further below. In certain embodiments of the present invention, the management system 190 may include management software (not shown) for initiating licensed operations. In such exemplary embodiments, an administrator may invoke a licensed operation via a user interface, such as a command line interface (CLI) and/or a graphical user interface (GUI). In alternate embodiments, a command may be invoked on one of the storage systems 110, 112, which then utilizes the management system 190 as a third party arbitrator in accordance with an illustrative embodiment of the present invention.

It will be understood to those skilled in the art that the inventive technique described herein may apply to any type of special-purpose computer (e.g., file serving appliance) or general-purpose computer, including a standalone computer, embodied as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements. Furthermore, while this description is written in terms of a source and destination mirroring arrangement, the principles of the present invention may be utilized with any licensed software. As such, the description of a mirroring environment should be taken as exemplary only.

In the illustrative embodiment, the memory 125 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes each storage system by, inter alia, invoking storage operations in support of a file service implemented by the storage system. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect each storage system 110, 112 to the network 118, which may comprise a point-to-point connection or a shared medium, such as a local area network. Moreover the source storage system 110 may interact with the destination storage system 112 in accordance with a client/server model of information delivery. That is, the source storage system (e.g. the "client") may request the services of the destination storage system (e.g., the "server"), and the destination storage system may return the results of the services requested by the source storage system, by exchanging packets 155 encapsulating, e.g., the TCP/IP protocol or another network protocol format over the network 118.

The storage adapter 140 cooperates with the operating system 200 (FIG. 2) executing on end storage system to access information requested by the other system. The information may be stored on the disks 160 that are attached, via the storage adapter 140 to each storage system 110, 112 or other node of a storage system as defined herein. The storage adapter 140 includes input/output (I/O) interface circuitry that couples to the disks over an I/O interconnect arrangement, such as a conventional high-performance, Fibre Channel serial link topology. The information is retrieved by the storage adapter and processed by the processor 120 prior to being forwarded over the system bus 145 to the network adapter 130, where the information is formatted into a packet and transmitted to the requesting system.

Each storage system may also be interconnected with one or more clients 170 via the network 118. The clients may transmit requests for file service to the source and destination storage systems 110, 112, respectively, and receive responses to the requests over a LAN or other network (118). Data is transferred between the client and the respective storage system 110, 112 using data packets 155.

In an illustrative embodiment, the disks 160 are arranged into a plurality of volumes (for example, source volumes 114 and destination volumes 116), in which each volume has a file system associated therewith. The volumes each include one or more disks 160. In one embodiment, the physical disks 160 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

Figure 2:
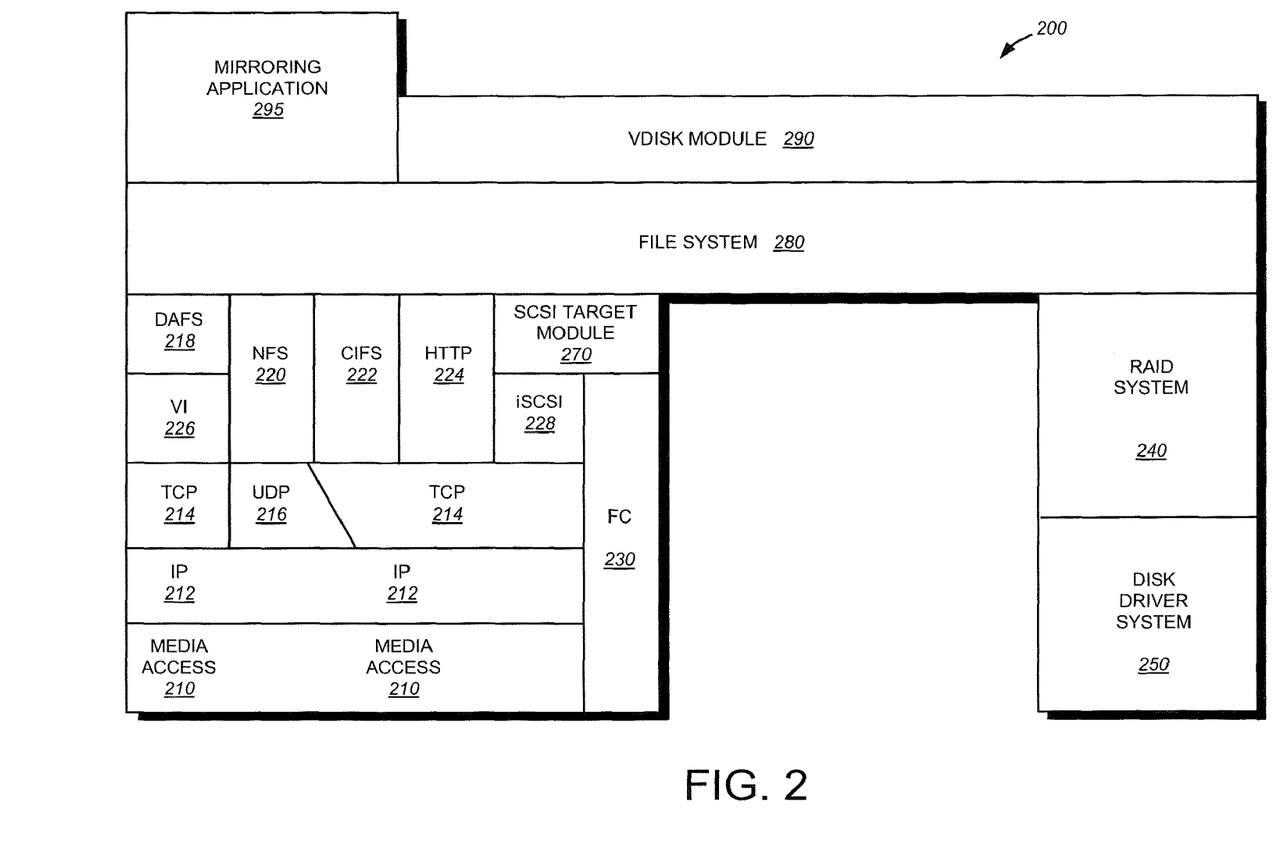
FIG. 2 is a schematic block diagram of an exemplary storage operating system for use on a storage system in accordance with an illustrative embodiment of the present invention.

To facilitate access to the disks 130, the storage operating system 200 implements a write-anywhere file system that cooperates with virtualization modules to "virtualize" the storage space provided by disks 130. The file system logically organizes the information as a hierarchical structure of named data containers, such as directories and files, on the disks. Each "on-disk" file may be implemented as set of disk blocks configure to store information, such as data, whereas the directory may be implemented as a specially formatted file in which names and links to other files and directories are stored. The virtualization modules allow the file system to further logically organize information as a hierarchical structure of data containers, such as blocks, on the disks that are exported as named luns.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Also included within storage operating system 200 is a mirroring application 295. The mirroring application 295 illustratively implements mirroring operations between source and destination storage systems 110, 112 in accordance with an illustrative embodiment of the present invention. Mirroring application 295 is utilized herein as an exemplary application that may be licensed separately and thereby may utilize the novel guard point licensing of the present invention. It should be noted that the principles of the present invention relating to guard point licensing may be utilized with any application or process that is individually licensed. As such, references to mirroring application 295 should be taken as exemplary only.

Operationally, a request from the client 170 is forwarded as a packet over the computer network 118 and onto the storage system 110, 112 where it is received at the network adapter 130. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core". If the information is not in core, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in memory 125 for processing by the storage system. Upon completion of the request, the storage system (and operating system) returns a reply to the client 170 over the network 118.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 110, 112 in response to a request issued by client 170. Moreover, in another alternate embodiment of the invention, the processing elements of adapters 130, 140 may be configured to offload some or all of the packet processing and storage access operations, respectively, from processor 120, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the file system module to implement the file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in previously mentioned U.S. patent application Ser. No. 10/215,917 titled MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. Guard Point Licensing

The present invention provides for guard point licensing of software functionality. Licensed software executing on a storage system is modified to include one or more guard points to ensure that appropriate licenses have been obtained by a customer. Generally, a guard point is invoked at any point during execution of an operation associated with a multi-tiered licensed process. To initialize a guard point, a management system obtains a first random number (R1) from the first system and passes R1 along with an application specific context command to the second system. The application specific context command is illustratively a text string utilized to initiate the operation in which the guard point was reached. The second system returns to the management system a pass phrase and a second random number (R2), which are then forwarded to the first system. The pass phrase is illustratively a data structure identifying the system that generated the phrase as well as containing the application specific context command. The above steps are then repeated with the first and second systems inverted, i.e., the management system obtains a first random number from the second system and passes the first random number and an application specific context command to the first system, etc.

Once the first and second systems have both received the pass phrase from each other, they verify the received pass phrases. Verification may be performed at each system by comparing each received pass phrase, including the received application specific context command with the application specific context command sent by the other system. Furthermore, each system may verify that system identification information, e.g., a serial number and/or model number, matches that of the other system involved in the operation. If the pass phrases do not match, the guard point remains "closed" and the operation is not permitted to be executed. However, if the pass phrases match, then the management system opens the guard point and operation execution is permitted to continue. Once verification is completed, the guard point is closed to thereby require additional verification for any subsequent operations invoking the guard point. Furthermore, each guard point includes an illustrative timeout period between the initialization and execution of the guard point. Should the timeout period be exceeded, the guard point closes itself and new pass phrases must be regenerated.

Figure 3:
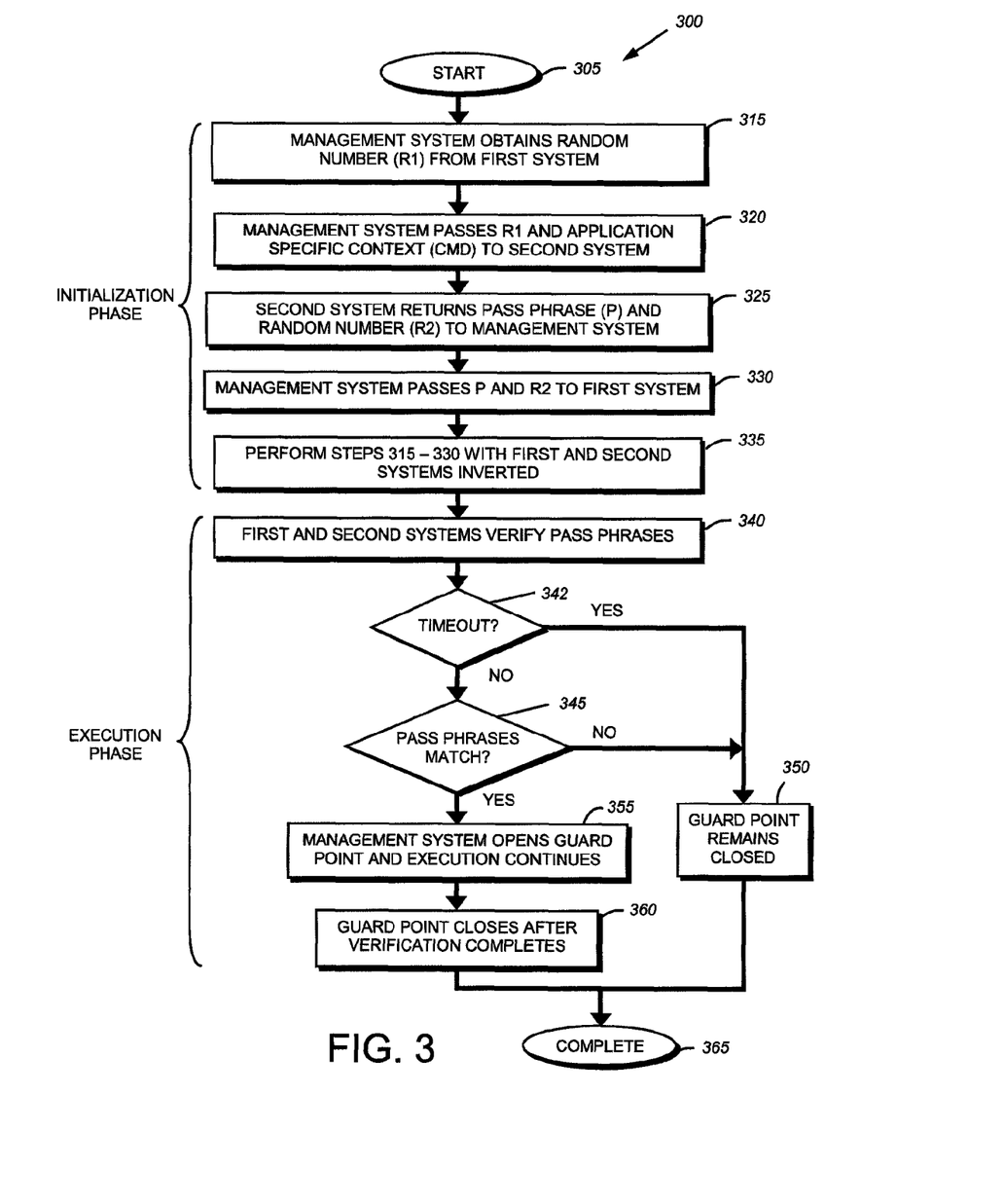
FIG. 3 is a flowchart detailing the steps of a procedure for guard point licensing in accordance with an illustrative embodiment of the present invention.

FIG. 3 is a flowchart detailing the steps of a procedure 300 for guard point licensing in accordance with an illustrative embodiment of the present invention. The procedure 300 begins in step 305 where the procedure 300 enters an initialization phase for the guard point. Generally, during the initialization phase, the parties to the guard point, i.e., the first and second systems and the management system, exchange information which is then verified during the execution phase of the guard point.

The guard point may be reached when, e.g., an administrator attempts to initiate a licensed operation, such as initiating a mirroring operation using mirroring application 295. Alternately, the guard point may be reached in other code paths that require appropriate licensing. These alternate code paths may include, e.g., other licensed functionality that utilizes a plurality of storage systems. Illustratively, software is modified to include guard points at the initialization of licensed operations to ensure that appropriate licenses have been obtained. However, the description of guard points being located at the initialization of a process should be taken as exemplary only.

To begin the initialization of the guard point, the management system 190 obtains a first random number (R1) from the first system in step 315. This may be accomplished by, e.g., the first system forwarding a R1 to the management system or may be the result of the management system requesting R1 from the first system. The management system then passes R1 and an application specific context command to the second system in step 320. Illustratively, the context command is a text string of a predefined number of characters utilized to initiate the licensed operation. In an illustrative embodiment, only a predefined number, e.g., 64, of the text characters are included in the context command. However in alternate embodiments the entire text of the command is included. For example, the command may be "mirror volume A on storage system A to volume B on storage system B," to initiate an appropriate mirroring operation. As will be appreciated by one skilled in the art, the command may vary based on the appropriate syntax required for particular storage system implementations. The second system, in step 325, returns a pass phrase (P) data structure 400 (see FIG. 4) and a second random number (R2) to the management system.

In step 330, the management system passes P and R2 to the first system. Illustratively, the management system may modify P before passing P and R2 to the first system. For example, the management system may perform a transformation on P and/or R2 using, e.g., R1 as a key. That is P and/or R2 may be encrypted using R1 as an encryption key. Thus, the P that is passed to the first system may be, e.g., $E_{R1}(P)$ where $E_{R1}( )$ represents an encryption procedure using R1 as the key. In alternative embodiments other transformations, other than encryption, may be utilized. Steps 315-330 are then performed with the first and second systems inverted in step 335. That is, step 315 is performed where the management system obtains a first random number from the second system, etc. Once step 335 has completed, the guard point is initialized. In accordance with an illustrative embodiment, a timeout period begins once the initialization phase has completed. Should the guard point not be verified within before the timeout period expires, the guard point remains closed and the previous generated pass phrases are invalidated.

The procedure then enters the execution phase, where the first and second systems independently verify the received pass phrases in step 340 and continues to step 342 where the system determines whether a timeout has occurred. As noted above, the guard point must be executed within a certain predefined timeout period from the completion of the initialization phase. Should a timeout occur, i.e., the execution has not occurred within the timeout period, the procedure branches to step 350 where the guard point remains closed. However, if no timeout occurs, the procedure continues to step 345 where a determination is made as to whether the pass phrases match. This verification may occur by each system decrypting the received pass phrase and context command and comparing the application specific context command with the context command that was passed to the management system. That is, the first and second systems compare the context received from the management station with the generated context. A match occurs when the application specific context command that was passed to the system is identical to the decrypted application context command contained in the received pass phrase. If the pass phrases do not match, the guard point remains closed (step 350) and the operation is not permitted to be performed. The procedure 300 then completes in step 365. However, if the pass phrases match in step 345, then the procedure continues to step 355 and the management system opens the guard point to permit operation execution to continue. The guard point is then closed in step 360 after the verification completes. By immediately closing the guard point, the system ensures that subsequently initiated operations undergo the full guard point verification process. The procedure then completes in step 365.

Figure 4:
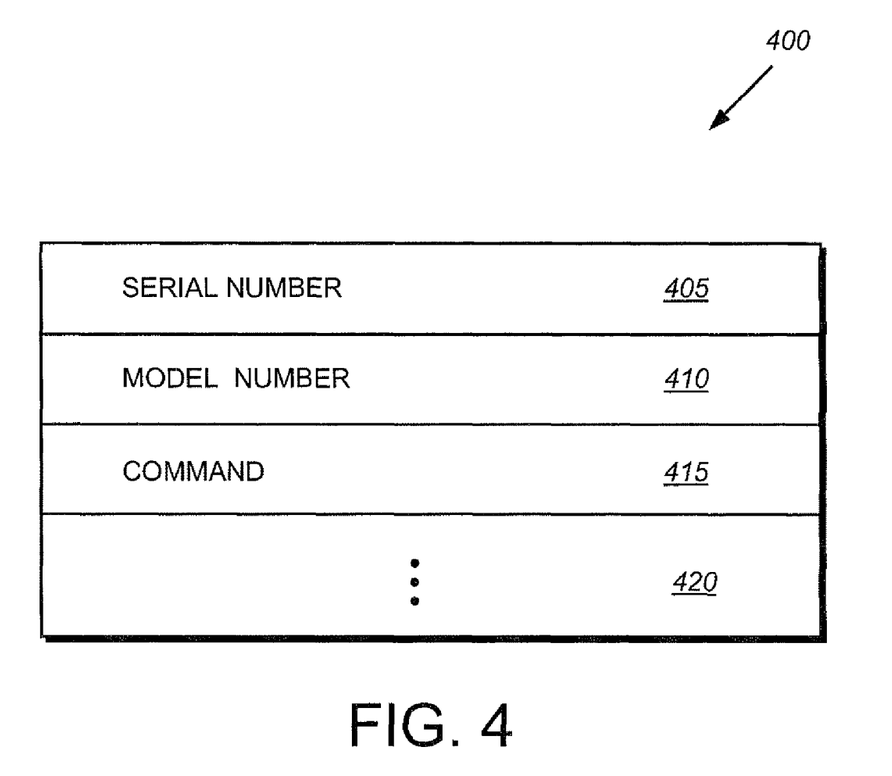
FIG. 4 is a schematic block diagram of an exemplary pass phrase data container in accordance with an illustrative embodiment of the present invention.

FIG. 4 is a schematic block diagram of an exemplary pass phrase data structure 400 in accordance with an illustrative embodiment of the present invention. The pass phrase data structure 400 includes a serial number field 405, a model number field 410, a command field 415 and, in alternate embodiments additional fields 420. The serial number field 405 contains the serial number of the storage system generating the pass phrase. This serial number provides a unique identifier of the storage system initiating a command with which the pass phrase is associated. By storing the serial number of the system originating a pass phrase, recipients of the pass phrase may utilize the serial number for authentication in accordance with alternate embodiments of the present invention. The model number field 410 contains a model number of the storage system generating the pass phrase. The model number identifies the class of system, e.g., low end, enterprises class, etc. The model number may be utilized to identify cross-class licensed operations, e.g., if one system is an enterprise class system and the other is a low end system. The command field 415 contains the command with which this pass phrase is associated. Illustratively, the command field contains the same content as the application specific context command that was passed among the storage systems.

The foregoing has been a detail description of illustrative embodiments of the invention. Various modifications and additions can be made without departing form the spirit and scope of the invention. For example, guard point licensing may be utilized in non-storage system environments. As such, the description of storage systems should be taken as exemplary only. It is also expressly contemplated that guard point licensing may occur among differing numbers of computers. As such, the description of only a first and second system in operation with a management system should be taken as exemplary only. Likewise, the internal architecture of the storage systems (servers) or their respective storage arrays, as well as their network connectivity and protocols, are all highly variable. The operating systems used on various source and destination servers can differ. In addition, it is expressly contemplated that any of the operations and procedures described herein can be implemented using hardware, software comprising a computer-readable medium having program instructions executing on a computer, or a combination of hardware and software.

What is claimed is:

1. A method for guard point licensing, comprising:
obtaining, by a management system from a first system, a first random number, the management system operatively connected to the first system;
passing, by the management system, the first random number and a first application specific context to a second system, the management system operatively connected to the second system;
obtaining, by the management system; from the second system, a first pass phrase and a second random number;
passing, by the management system, the first pass phrase and the second random number to the first system;
obtaining, by the management system from the second system, a third random number;
passing, by the management system, the third random number and a second application specific context to the second system;
obtaining, by the management system from the first system, a second pass phrase and a fourth random number;
passing, by the management system, the second pass phrase and the fourth random number to the second system;
and
verifying, by the first and second systems, the passed pass phrases.

2. The method of claim 1 wherein the application specific context comprises a text field.

3. The method of claim 2 wherein the text field comprises at least part of a command entered by an administrator to invoke a process associated with the application specific context.

4. The method of claim 1 further comprising permitting, in response to verifying the pass phrases, execution of a process associated with the application specific context to continue by opening a guard point.

5. The method of claim 4 further comprising closing the guard point after permitting execution of the process to continue.

6. The method of claim 1 wherein at least one of the pass phrases comprises a command field.

7. The method of claim 6 wherein the command field comprises at least part of a command entered by an administrator to invoke a process associated with the application specific context.

8. The method of claim 1 wherein at least one of the pass phrases comprises an identifier of the system generating the pass phrase.

9. The method of claim 1 wherein at least one of the first and second systems comprise a storage systems.

10. The method of claim 4 wherein the guard point comprises initiation of the process.

11. The method of claim 4 wherein the process comprises a mirroring operation.

12. A computer readable storage medium containing executable program instructions for execution by a processor, the computer readable storage medium comprising:
program instructions that obtain, by a management system; from a first system, a first random number, the management system operatively connected to the first system;
program instructions that pass, by the management system, the first random number and a first application specific context to a second system, the management system operatively connected to the second system;

program instructions that obtain, by the management system; from the second system, a first pass phrase and a second random number;

program instructions that pass, by the management system, the first pass phrase and the second random number to the first system;

program instructions that obtain, by the management system from the second system, a third random number;

program instructions that pass, by the management system, the third random number and a second application specific context to the second system;

program instructions that obtain, by the management system from the first system, a second pass phrase and a fourth random number;

program instructions that pass, by the management system, the second pass phrase and the fourth random number to the second system; and program instructions that verify, by the management system, by the first and second systems, the received pass phrases.

13. A system for guard point licensing, comprising:

a processor of a management system configured to initialize a guard point during execution of a process, the management system configured to connect to a first and second systems, the management system further configured to, in response to initializing the guard point;

obtain, from the first system, a first random number,
pass the first random number and a first application specific context to the second system,
obtain, from the second system, a first pass phrase and a second random number,
pass the first pass phrase and the second random number to the first system;
obtain, from the second system, a third random number,
pass the third random number and a second application specific context to the second system,
obtain, from the first system, a second pass phrase and a fourth random number,
pass the second pass phrase and the fourth random number to the second system; and
wherein the first and second systems are configured to verify the passed pass phrases.

14. The system of claim 13 wherein the first and second systems comprise storage systems.

15. The system of claim 13 wherein at least one of the first and second application specific contexts comprises a text field.

16. The system of claim 15 wherein the text field comprises at least part of a command entered by an administrator to invoke the process.

17. The system of claim 13 wherein the management system is further configured to open the guard point to permit execution of the process to continue in response to the first and second systems verifying the pass phrases.

18. The system of claim 17 wherein the management system is further configured to close the guard point after permitting execution of the process to continue.

19. The system of claim 13 wherein at least one of the pass phrases comprises a command field.

20. The system of claim 19 wherein the command field comprises at least part of a command entered by an administrator to invoke the process associated with at least one of first and second application specific contexts.

21. The system of claim 13 wherein the guard point comprises initiation of the process.

22. The system of claim 13 wherein the process comprises a mirroring operation.

* * * * *